US008953633B2

(12) United States Patent
Bhatia et al.

(10) Patent No.: US 8,953,633 B2
(45) Date of Patent: Feb. 10, 2015

(54) METHODS AND DEVICE OF MANAGING RESOURCES IN A WIRELESS COMMUNICATION NETWORK

(75) Inventors: Ashutosh Bhatia, Bangalore (IN); Ranjeet Kumar Patro, Bangalore (IN); Thenmozhi Arunan, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 13/580,544

(22) PCT Filed: Feb. 22, 2011

(86) PCT No.: PCT/KR2011/001161
§ 371 (c)(1),
(2), (4) Date: Oct. 22, 2012

(87) PCT Pub. No.: WO2011/102700
PCT Pub. Date: Aug. 25, 2011

(65) Prior Publication Data
US 2013/0039350 A1 Feb. 14, 2013

(30) Foreign Application Priority Data
Feb. 22, 2010 (IN) .............................. 454/CHE/2010

(51) Int. Cl.
*H04W 72/04* (2009.01)
*H04W 48/12* (2009.01)
*H04L 12/24* (2006.01)

(52) U.S. Cl.
CPC ........... *H04W 48/12* (2013.01); *H04L 41/0846* (2013.01)
USPC ............................ 370/445; 370/254; 370/329

(58) Field of Classification Search
USPC .......................................... 370/254, 329, 445
See application file for complete search history.

(56) References Cited

U.S. PATENT DOCUMENTS

| 7,548,521 | B2 * | 6/2009 | Jogi et al. ...................... 370/328 |
| 7,724,713 | B2 * | 5/2010 | Del Prado Pavon et al. . 370/338 |
| 8,031,666 | B2 * | 10/2011 | Jeon et al. ..................... 370/329 |
| 8,730,838 | B2 * | 5/2014 | Liang et al. ................... 370/254 |
| 2005/0025092 | A1 | 2/2005 | Morioka et al. |
| 2006/0050742 | A1 | 3/2006 | Grandhi et al. |
| 2007/0058661 | A1 * | 3/2007 | Chow ............................ 370/445 |
| 2008/0232270 | A1 * | 9/2008 | Fleming et al. ............... 370/254 |

(Continued)

FOREIGN PATENT DOCUMENTS

| CN | 101455034 A | 6/2009 |
| JP | 2004350168 A | 12/2004 |

(Continued)

Primary Examiner — Jay P Patel
(74) Attorney, Agent, or Firm — Jefferson IP Law, LLP (57) ABSTRACT

A method and a device for managing resources in a wireless communication network are provided. In one embodiment, a Medium Access Control (MAC) superframe format for a wireless communication network includes a beacon frame including beacon information for synchronizing devices in the wireless communication network and for defining structure of the MAC superframe, where the beacon information includes superframe structure information and synchronization information. The MAC superframe format also includes at least one multi-node connection frame substantially following the beacon frame and including device specific information and network specific information for allocating resources to one or more of the devices and/or providing network configuration parameters to the devices.

27 Claims, 6 Drawing Sheets

(56) References Cited

U.S. PATENT DOCUMENTS

| | | |
|---|---|---|
| 2008/0253328 A1 | 10/2008 | Sahinoglu et al. |
| 2009/0154489 A1 | 6/2009 | Bae et al. |
| 2009/0238160 A1 | 9/2009 | Bhatti et al. |
| 2010/0165916 A1* | 7/2010 | Duan et al. ............ 370/328 |
| 2010/0246514 A1* | 9/2010 | Jeon et al. ............ 370/329 |
| 2010/0260085 A1* | 10/2010 | Wang et al. ............ 370/311 |
| 2010/0304772 A1* | 12/2010 | Wang et al. ............ 455/509 |
| 2011/0019645 A1* | 1/2011 | Jeon et al. ............ 370/331 |
| 2011/0019646 A1* | 1/2011 | Jeon et al. ............ 370/331 |
| 2011/0064072 A1* | 3/2011 | Wang et al. ............ 370/350 |
| 2011/0090880 A1* | 4/2011 | Abraham et al. ............ 370/338 |
| 2011/0255500 A1* | 10/2011 | Cavalcanti et al. ............ 370/329 |
| 2011/0299423 A1* | 12/2011 | Shim et al. ............ 370/254 |
| 2013/0107869 A1* | 5/2013 | Abraham et al. ............ 370/338 |
| 2013/0182647 A1* | 7/2013 | Shao et al. ............ 370/328 |
| 2013/0230126 A1* | 9/2013 | Zhang et al. ............ 375/340 |
| 2014/0072080 A1* | 3/2014 | Zhang et al. ............ 375/340 |
| 2014/0092766 A1* | 4/2014 | Wang et al. ............ 370/252 |
| 2014/0133390 A1* | 5/2014 | Kwon et al. ............ 370/315 |

FOREIGN PATENT DOCUMENTS

| | | |
|---|---|---|
| JP | 2008289135 A | 11/2008 |
| WO | 2005/094007 A1 | 10/2005 |
| WO | 2009/072088 A2 | 6/2009 |
| WO | 2009/116682 A1 | 9/2009 |

* cited by examiner

FIG.6

METHODS AND DEVICE OF MANAGING RESOURCES IN A WIRELESS COMMUNICATION NETWORK

PRIORITY

This application is a National Stage application under 35 U.S.C. §371 of an International application filed on Feb. 22, 2011 and assigned application No. PCT/KR2011/001161, and claims the benefit under 35 U.S.C. §365(b) of a Indian patent application filed in the Indian Intellectual Property Office on Feb. 22, 2010 and assigned Serial No. 454/CHE/2010, the entire disclosure of which is hereby incorporated by reference.

BACKGROUND OF THE INVENTION

1. Field of the Invention

The present invention relates to the field of wireless communication network. More particularly, the present invention relates to managing resources in a wireless communication network.

2. Description of the Related Art

Typically, a wireless communication network such as a Time Division Multiple Access (TDMA) based network includes a controller or central hub, and multiple devices wirelessly connected to the controller. The controller is an entity responsible for creation and management of such a slotted network. In a slotted centralized network, the controller periodically transmits a beacon frame to define a Medium Access Control (MAC) superframe for managing access to a wireless channel between multiple devices. A MAC superframe is subdivided into an active period and an inactive period. The active period is a period during which multiple devices perform data communication with the controller. In contrast, the inactive period is a period during which the multiple devices and the controller can enter a sleep mode. The active period of the MAC superframe is generally subdivided into multiple of Contention Access Periods (CAPs) and a Contention Free Period (CFP) having guaranteed time slots, where the beacon frame is transmitted at the beginning of MAC superframe or beacon period. Optionally, an end of poll frame or B2 frame may be transmitted any time during the active period.

The start of the MAC superframe is marked by a beacon frame which is transmitted during the beacon period. Typically, the beacon frame defines a superframe structure and includes synchronization information, network configuration information, and resource allocation information associated with the multiple devices in the TDMA based network. Thus, each of the devices listens to the beacon frame to receive resource allocation information, structure of the MAC superframe defined by the controller, network configuration such as number of devices in the TDMA based network, location and number of free slots available in the MAC superframe, and the like, and to keep themselves synchronized with the controller for accurately locating their allocated timeslots and transmit the data.

However, the beacon frame may carry information on a need basis and hence the size of beacon frame is variable in nature. For example, the beacon frame includes resource allocation information for one of the multiple devices when the controller receives a connection request from the one of the multiple devices. Once the respective device receives the resource allocation information, the controller may remove the resource allocation information from the beacon frame. Because, the beacon frame includes device specific and global information, the size of beacon frame may become very large (especially when the beacon frame carries information for a large number of devices). In such a case, listening to the large beacon frame by the devices, when most of the information in the beacon frame is not intended for those devices, may lead to significant power consumption at the device end. Such significant power consumption may greatly impact battery life of devices with limited energy sources in networks such as Body Area Network (BAN).

Additionally, the device has to wait for a beacon frame in a next MAC superframe to receive resource allocation information. However, this may lead to higher allocation latency when the length of MAC superframe is large. Moreover, if the devices avoid listening to beacon frames, data traffic in the contention access period substantially following the beacon period may collide with the large sized beacon frame.

Therefore, a need exists for a method and device for managing resources in a wireless communication network.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problems and/or disadvantages and to provide at least the advantages described below. Accordingly, an aspect of the present invention is to provide methods and device for managing resources in a wireless communication network.

In accordance with an aspect of the present invention, a Medium Access Control (MAC) superframe format for a wireless communication network is provided. The MAC superframe format includes a beacon frame including beacon information for synchronizing devices in the wireless communication network and for defining a structure of the MAC superframe, wherein the beacon information includes superframe structure information and synchronization information, and at least one multi-node connection frame substantially following the beacon frame, wherein the at least one multi-node connection frame includes device specific information and network specific information for at least one of allocating resources to one or more of the devices and providing network configuration parameters to the devices.

In accordance with another aspect of the present invention, a method of communicating a network configuration in a wireless communication network is provided. The method includes detecting a change in a current network configuration associated with the plurality of devices, forming a MAC superframe to indicate the change in current network configuration for communication to the plurality of devices, wherein the MAC superframe comprises a beacon frame including superframe structure information and synchronization information, and at least one multi-node connection frame substantially following the beacon frame, wherein the at least one multi-node connection frame includes resource allocation information and network configuration information associated with the changed current network configuration.

In accordance with another aspect of the present invention, a method of allocating resources in a wireless communication network, wherein the wireless communication network comprises a controller and a plurality of devices coupled to the controller is provided. The method includes sending a connection request by a device to the controller, wherein the connection request includes a request for multi-node connection assignment, receiving an acknowledgement frame in response to the connection request by the device, applying a power saving mode by the device after successfully receiving the acknowledgment frame, and receiving a beacon frame and at least one multi-node assignment frame substantially following the beacon frame in a MAC superframe by the device, wherein the beacon frame includes superframe structure information and synchronization information, and wherein the at least one multi-node connection frame includes device specific information and network specific information for the device.

In accordance with another aspect of the present invention, a method of allocating resources in a wireless communication network, wherein the wireless communication network comprises a controller and a plurality of devices coupled to the controller is provided. The method includes receiving a connection request from a plurality of devices, wherein the connection request indicates a multi-node connection assignment, and forming a MAC superframe including a beacon frame and at least one multi-node assignment frame substantially following the beacon frame for communication to the plurality of devices based on the received connection request, wherein the beacon frame includes superframe structure information and synchronization information, and wherein the at least one multi-node connection frame includes device specific information and network specific information for the plurality of devices.

In accordance with another aspect of the present invention, a controller is provided. The controller includes a processor, and memory coupled to the processor and configured to temporarily store instructions capable of: forming a MAC superframe comprising a beacon frame including superframe structure information and synchronization information, and at least one multi-node connection frame substantially following the beacon frame, wherein the at least one multi-node connection frame includes resource allocation information and network configuration information associated with one or more devices communicatively connected to the controller, and communicating the beacon frame and the at least one multi-node connection frame substantially following the beacon frame in the MAC superframe to the one or more devices.

The present invention provides a method of communicating a network configuration in a wireless communication network, wherein the wireless communication network comprises a controller and a plurality of devices coupled to the controller, and a MAC superframe format for a wireless communication network Other aspects, advantages, and salient features of the invention will become apparent to those skilled in the art from the following detailed description, which, taken in conjunction with the annexed drawings, discloses exemplary embodiments of the invention.

DESCRIPTION OF THE DRAWINGS

The above and other aspects, features, and advantages of certain exemplary embodiments of the present invention will be more apparent from the following detailed description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
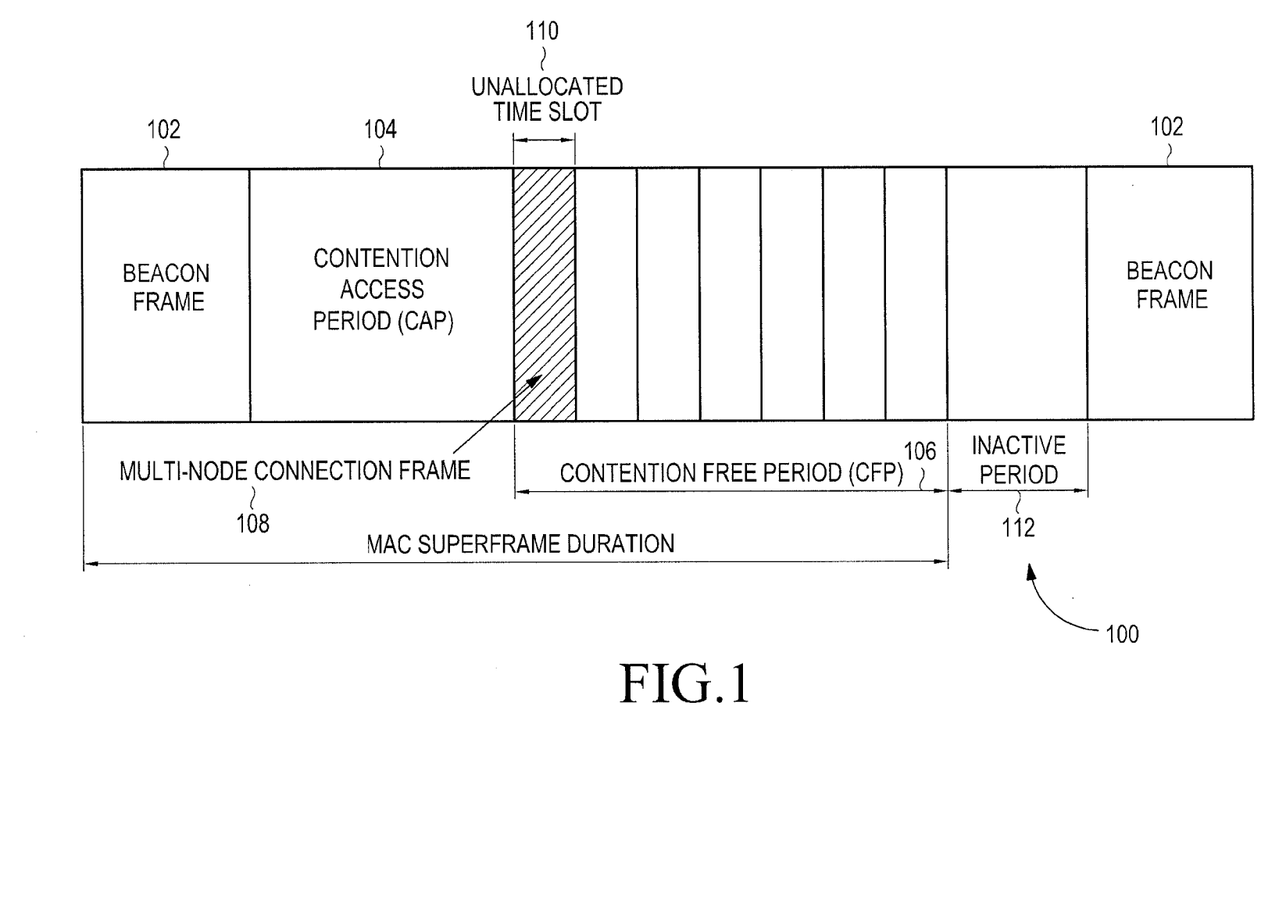
FIG. 1 illustrates a Medium Access Control (MAC) superframe format for a wireless communication network for efficiently managing network resources and for quicker resource reservation, according to an exemplary embodiment of the present invention.

FIG. 1 illustrates a Medium Access Control (MAC) superframe format 100 for a wireless communication network for efficiently managing network resources and for quicker resource reservation, according to an exemplary embodiment of the present invention. In FIG. 1, the MAC superframe format 100 includes a beacon frame 102, a Contention Access Period (CAP) 104, a Contention Free Period (CFP) 106 with one or more unallocated time slots 110 substantially following the CAP 104, and an inactive period 112. The beacon frame 102 includes beacon information such as superframe structure information and synchronization information. The superframe structure information defines the MAC superframe format 100. The synchronization information enables devices in the wireless communication network to keep the devices synchronized with a controller such that the devices accurately locate allocated timeslots and transmit data.

The MAC superframe format 100 also includes a multi-node connection frame(s) 108 that includes device specific information and network specific information. The device specific information includes slot allocation information. The network specific information includes a number of free time slots, a location of the free time slots, a number of devices in the wireless communication network, and network configuration information. As illustrated, the multi-node connection frame(s) 108 is transmitted in the unallocated time slot 110 of the CFP 106. In an exemplary embodiment of the present invention, the multi-node connection frame(s) 108 may be transmitted in the MAC superframe 100 in response to connection requests from the devices. In an alternate exemplary embodiment of the present invention, the multi-node connection frame(s) 108 may be transmitted in the MAC superframe 100 when a change in network configuration is detected. In such a case, the multi-node connection frame(s) 108 may be communicated to connected devices as well as to unconnected devices in the wireless communication network.

The presence, position and content characteristics of the multi-node connection frame(s) 108 is indicated in a MAC capability field (not shown) of the beacon frame 102. In an exemplary embodiment of the present invention, one byte in the MAC capability field indicates a position of the multi-node connection frame(s) 108 in the MAC superframe 100. This byte that indicates the position of the multi-node connection frame assists devices, which need not wait during the active period of the MAC superframe 100 to receive the multi-node connection frame(s) 108, to skip listening remaining portion of the MAC superframe 100 following the beacon frame 102.

Further, according to exemplary embodiments of the present invention, two bits in the beacon frame 102 indicate the presence and content characteristics of the multi-node connection frame(s) 108. For example, the bit values '00' indicates absence of the multi-node connection frame 108 in the MAC superframe 100. This indicates the devices that the network scenario is static, all devices are connected, and no network configuration change is allowed by the controller. The bit values '01' indicates the presence of the multi-node connection frame 108 in the MAC superframe 100 but the multi-node connection frame 108 is same as transmitted earlier. Hence, the devices which have already listened to the multi-node connection frame 108 need not listen again. The bit values '10' indicates presence of the multi-node connection frame 108 including resource allocation information. In such a case, only devices which are expecting any resource allocation or related information listens to the multi-node connection frame 108. The bit values '11' indicates presence of the multi-node connection frame 108 including network specific information. In this case, all connected devices and unconnected devices listen to the multi-node connection frame 108 to update a holistic view of network wide information.

Figure 2:
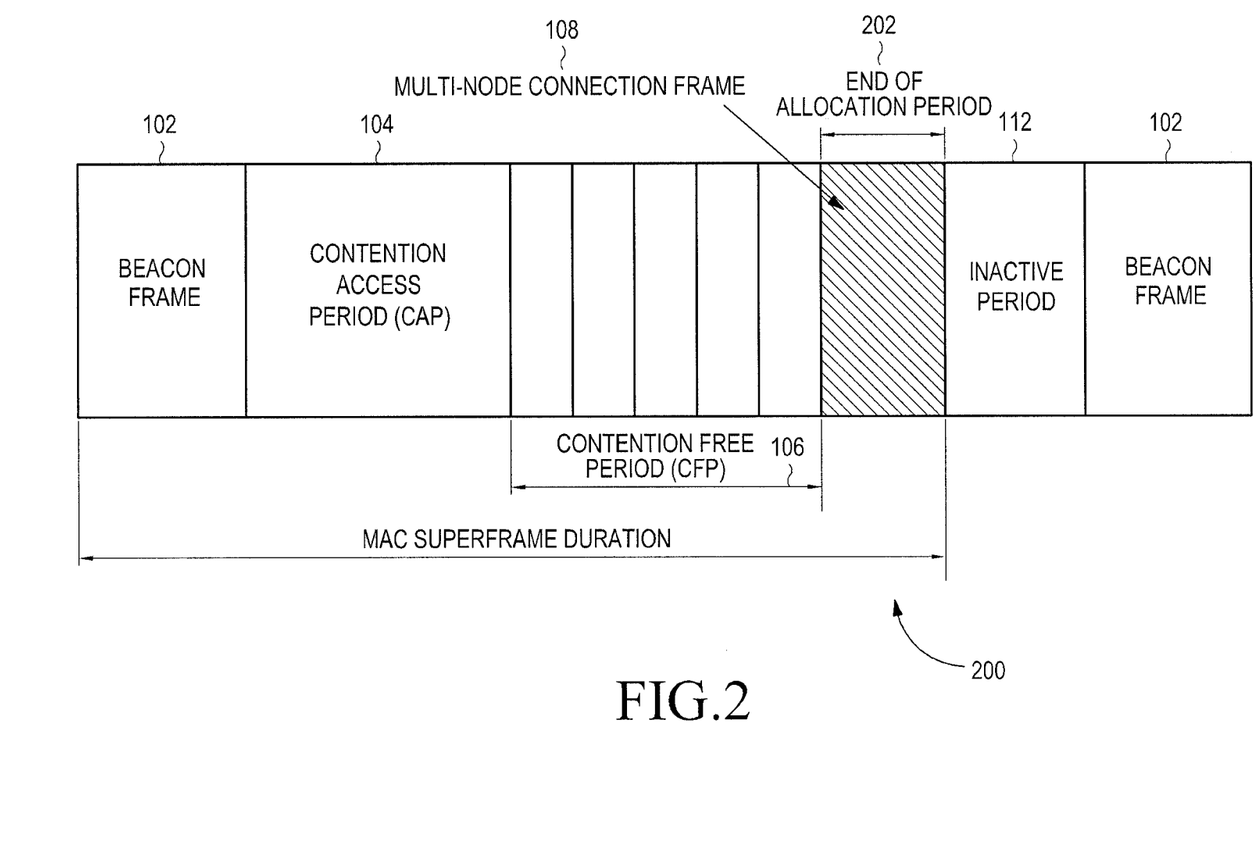
FIG. 2 illustrates a MAC superframe format for a wireless communication network, according to an exemplary embodiment of the present invention.

FIG. 2 illustrates a MAC superframe format 200 for a wireless communication network, according to an exemplary embodiment of the present invention. According to the exemplary embodiment of the present invention, the MAC superframe 200 is similar to the MAC superframe 100 except the multi-node connection frame(s) is transmitted in an end of allocation period 202 instead of the CFP 106. The multi-node connection frame(s) 108 in the end of allocation period 202 may include a group acknowledgment IE for acknowledging receipt of previous uplink data transmission by the devices and also time sharing information.

Figure 3:
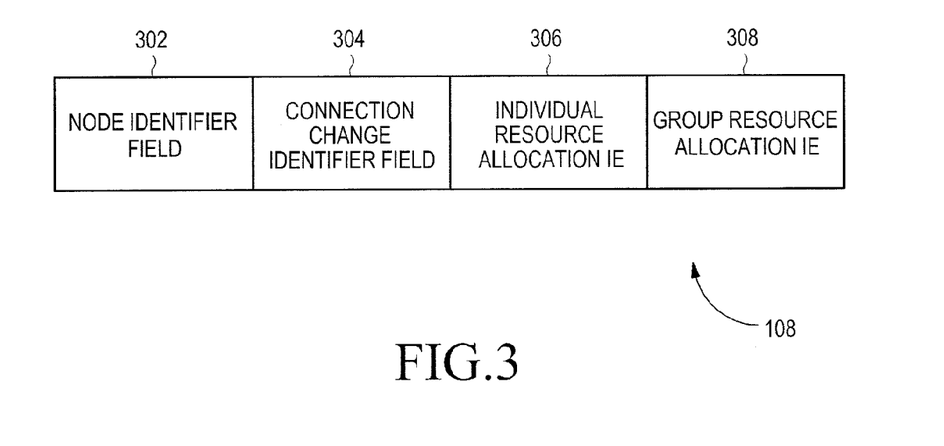
FIG. 3 illustrates an exemplary format of a multi-node connection frame such as, for example, the multi-node connection frame shown in FIG. 1, according to an exemplary embodiment of the present invention.

FIG. 3 illustrates an exemplary format of the multi-node connection frame 108 such as, for example, the multi-node connection frame shown in FIG. 1, according to an exemplary embodiment of the present invention. The multi-node connection frame 108 includes a node identifier field 302, a connection change indicator field 304, an individual resource allocation information element 306, and a group resource allocation information element 308. The node identifier field 302 indicates identifiers associated with each of corresponding devices. The connection change identifier field 304 indicates change in network configuration associated with connected and unconnected devices and also new network configuration to be applied by the connected devices and the unconnected devices. The connection change identifier field 304 is present in the multi-node connection frame 108 when a change in network configuration is detected.

The individual resource allocation IE 306 includes resources allocated to a particular device in response to a connection request from the particular device. The group resource allocation IE 308 includes resources allocated to a set of devices in the wireless communication network in response to individual connection request received from the set of devices. The individual resource allocation IE 306 is included in the multi-node connection frame 108 when the device indicates through the connection request that the device intends to receive an individual multi-node connection frame. Otherwise, when a set of devices intend to receive resource allocation information through a single multi-node connection assignment frame 108, then the controller transmits the multi-node connection frame 108 including the group resource allocation IE 308 in the MAC superframe 100.

The multi-node connection frame 108 may also include a length of contention period field, a length of active period field, and a group acknowledgement information element when the multi-node connection frame 108 is transmitted in the end of allocation period 202. This is the case when the length of the CFP 106 is not defined in the beacon frame 102.

Figure 4:
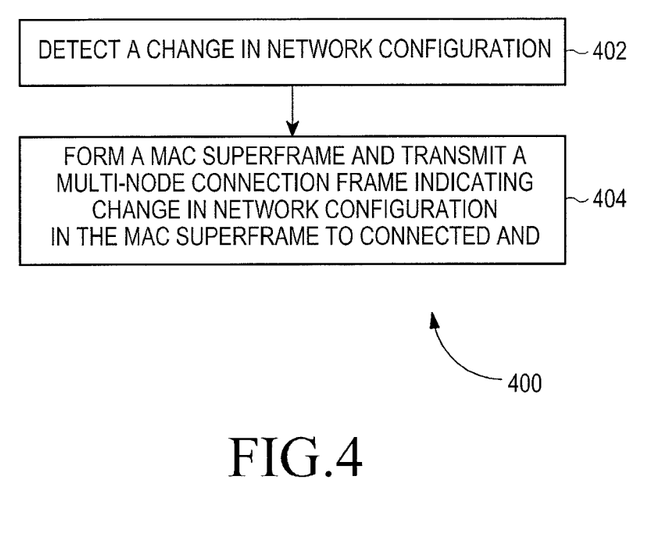
FIG. 4 illustrates a process flowchart of an exemplary method of communicating a change in network configuration to devices in the wireless communication network, according to an exemplary embodiment of the present invention.

FIG. 4 illustrates a process flowchart 400 of an exemplary method of communicating a change in network configuration to devices in the wireless communication network, according to an exemplary embodiment of the present invention. At step 402, a change in network configuration associated with the devices is detected by the controller. At step 404, a MAC superframe indicating the change in network configuration is formed and a multi-node connection frame in the MAC superframe 100 is transmitted to the connected and unconnected devices for indicating the change in network configuration. As shown in FIG. 3, the connection change indicator field 304 of the multi-node connection frame 108 is used to provide changed network configuration information.

Figure 5:
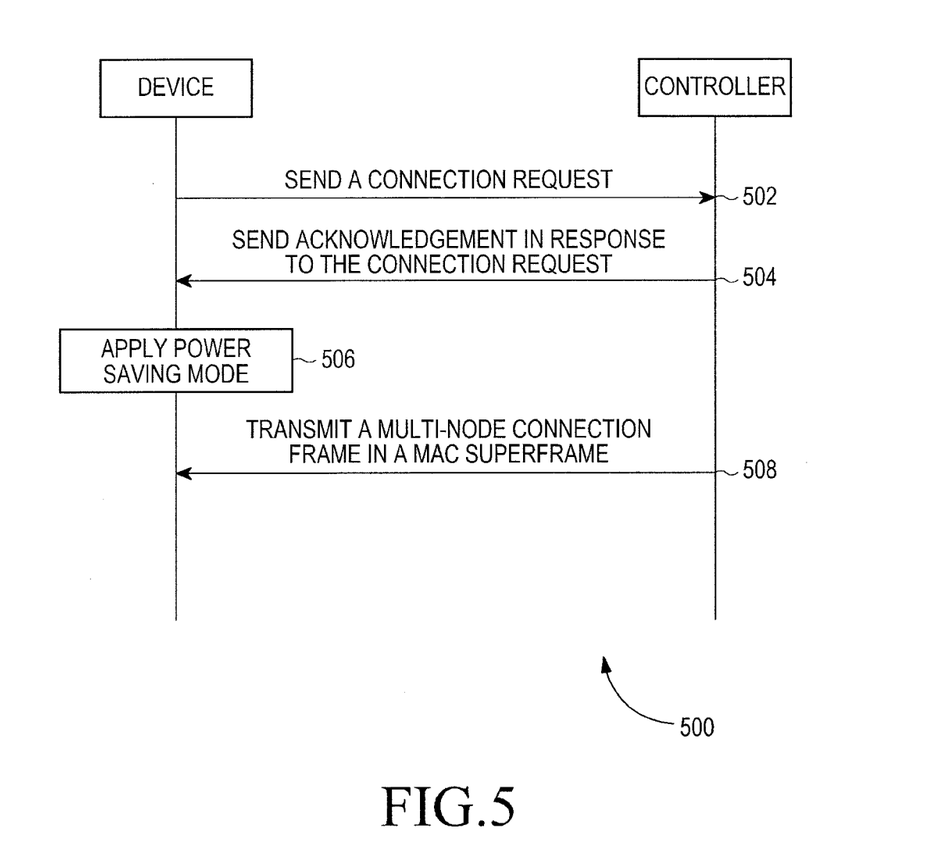
FIG. 5 is a flow diagram illustrating an exemplary method of allocating resources to device(s) using the multi-node connection frame of the MAC superframe, according to an exemplary embodiment of the present invention.

FIG. 5 is a flow diagram 500 illustrating an exemplary method of allocating resources to device(s) using the multi-node connection frame 108 of the MAC superframe 100, according to an exemplary embodiment of the present invention. At step 502, a device(s) sends a connection request to a controller. The connection request indicates whether connection assignment is individual or multi-node type. At step 504, the controller sends an acknowledgement in response to receipt of connection request from the device(s). At step 506, the device(s) applies power saving mode upon receiving the acknowledgement. The power saving mode is applied until the point the device(s) receives a beacon frame in a MAC superframe associated with connection assignment. In an exemplary embodiment of the present invention, the power saving mode is applied when the device(s) wishes to receive connection assignment along with other devices as indicated through the connection request.

At step 508, the controller forms a MAC superframe 100 including a beacon frame 102 and a multi-node connection frame 108 and transmits the beacon frame 102 and the multi-node connection frame 108 in the MAC superframe 100 to allocate resources to the device(s). In an exemplary embodiment of the present invention, the controller transmits the multi-node connection frame 108 which includes the individual resource allocation IE 306 containing resource allocation information when the connection request indicates individual connection assignment. In such an exemplary embodiment of the present invention, the device may not apply power saving mode and remain in an active mode. In another exemplary embodiment of the present invention, the controller transmits the multi-node connection frame 108 which includes the group resource allocation IE 308 including resource allocation information when the connection request indicates multi-node connection assignment.

Figure 6:
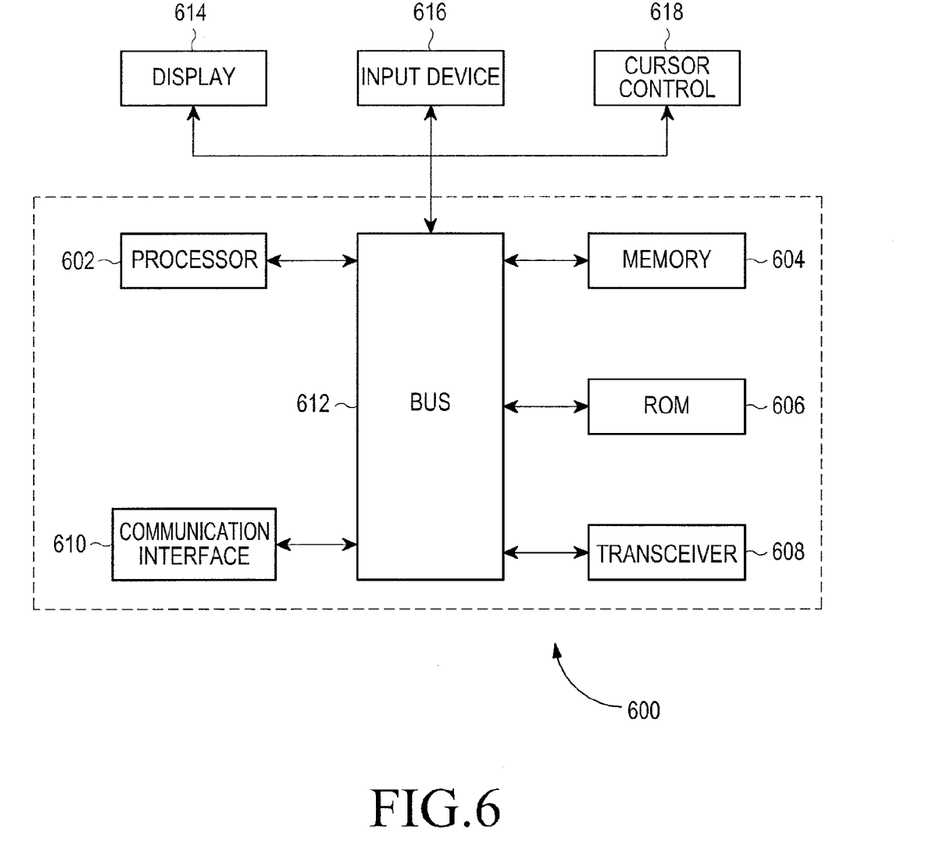
FIG. 6 is a block diagram of a controller showing various components for implementing exemplary embodiments of the present invention.

FIG. 6 is a block diagram of a controller 600 showing various components for implementing exemplary embodiments of the present invention.

Referring to FIG. 6, the controller 600 includes a processor 602, a memory 604, a read only memory 606, a transceiver 608, a communication interface 610, a bus 612, a display 614, an input device 616, and a cursor control 618.

The processor 602, as used herein, corresponds to any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 602 may also include embedded controllers, such as generic or programmable logic devices or arrays, application specific integrated circuits, single-chip computers, smart cards, and the like.

The memory 604 and the ROM 606 may correspond to volatile memory and non-volatile memory. The memory 604 includes instructions temporarily stored therein to form a MAC superframe 100 for communication to one or more devices as illustrated in FIGS. 1 and 2.

A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

Exemplary embodiments of the present invention may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 602. For example, a computer program may include machine-readable instructions capable of forming the MAC superframe 100 for communication to one or more devices according to the teachings and herein described embodiments of the present subject matter. In one embodiment, the program may be included on a Compact Disk-Read Only Memory (CD-ROM) and loaded from the CD-ROM to a hard drive in the non-volatile memory. The machine-readable instructions may cause the controller 600 to encode according to the various embodiments of the present subject matter.

The transceiver 608 may be capable of receiving a connection request from one or more devices and capable of transmitting the beacon frame 102 and the multimode connection frame(s) 108 in the MAC superframe 100 to the one or more devices. The bus 610 acts as an interconnect between various components of the controller 600. The components such as communication interfaces 612, the display 614, the input device 616, and the cursor control 618 are well known to the person skilled in the art and hence the explanation is thereof omitted. It is appreciated that, exemplary embodiments of the present invention may be suitable for wireless local area networks and short range wireless networks, and more specifically to body area networks and sensor networks in which devices are subject to power constraints and long life time of devices is one of the major requirements.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method for performing communication by a device in a wireless communication network, the method comprising:
    performing, by the device, the communication using a medium access control (MAC) superframe including a beacon frame and at least one multi-node connection frame following the beacon frame,
    wherein the beacon frame includes beacon information including MAC superframe structure information and synchronization information for synchronization of the device, information indicating whether the at least one multi-node connection frame is included in the MAC superframe, and position information of the at least one multi-node connection frame, and
    wherein the at least one-multi-node connection frame includes device specific information including resource allocation information for the device and network specific information including configuration information of the wireless communication network.

2. The method of claim 1, wherein the MAC superframe includes:
    at least one contention access period following the beacon frame; and
    at least one contention free period following the at least one contention access period,
    wherein the at least one contention free period includes at least one unallocated time slot.

3. The method of claim 1, wherein the MAC superframe includes:
    at least one contention free period following the beacon frame, wherein the at least one contention free period includes at least one unallocated time slot; and
    at least one contention access following the at least one contention free period.

4. The method of claim 2, wherein the at least one multi-node connection frame is included in the at least one unallocated time slot.

5. The method of claim 2, wherein the MAC superframe includes:
    an end part of allocation period following the at least one contention free period,
    wherein the end part of allocation period includes length information of the at least one content access period, and group acknowledgement information indicative of acknowledgement to uplink transmission of the device.

6. The method of claim 5, wherein the multi-node connection frame is included in the end part of allocation period.

7. The method of claim 1, wherein the device specific information includes slot allocation information for the device.

8. The method of claim 1, wherein the network specific information includes information about a number of free time slots, information about a location of the free time slots, and information about a number of devices in the wireless communication network.

9. A method for generating a medium access control (MAC) superframe by a controller in a wireless communication network, the method comprising:
- detecting, by the controller, a change in configuration of the wireless communication network for performing communication with at least one device; and
- generating, by the controller, the MAC superframe to indicate the change in the configuration of the wireless communication network for performing communication with at least one device,
- wherein the MAC superframe includes a beacon frame and at least one multi-node connection frame following the beacon frame,
- wherein the beacon frame includes beacon information including MAC superframe structure information and synchronization information for synchronization of the at least one device, information indicating whether the at least one multi-node connection frame is included in the MAC superframe, and position information of the at least one multi-node connection frame, and
- wherein the at least one multi-node connection frame includes device specific information including resource allocation information of the at least one device and network configuration information including configuration information of the changed wireless communication network.

10. The method of claim 9, wherein the MAC superframe includes:
- at least one contention access period following the beacon frame; and
- at least one contention free period including at least one unallocated time slot,
- wherein the at least one unallocated time slot includes the at least one multi-node connection frame.

11. The method of claim 9, wherein the MAC superframe includes:
- at least one contention access period following the beacon frame;
- at least one contention free period following the at least one contention access period; and
- an end part of allocation period following the at least one contention free period,
- wherein the end part of allocation period includes the at least one multi-node connection frame, length information of the at least one content access period, and group acknowledgement information indicative of acknowledgement to uplink transmission of the at least one device.

12. A method for receiving a medium access control (MAC) superframe by a device in a wireless communication network, the method comprising:
- transmitting, by the device, a connection request to a controller, wherein the connection request includes a request for multi-node connection assignment;
- receiving, by the device, an acknowledgement frame in response to the connection request;
- performing, by the device, a power saving mode after successfully receiving the acknowledgment frame; and
- receiving, by the device, a beacon frame and at least one multi-node connection frame following the beacon frame in the MAC superframe,
- wherein the beacon frame includes beacon information including MAC superframe structure information and synchronization information for synchronization of the device, information indicating whether the at least one multi-node connection frame is included in the MAC superframe, and position information of the at least one multi-node connection frame, and
- wherein the at least one multi-node connection frame includes device specific information including resource allocation information for the device and network specific information including configuration information of the wireless communication network.

13. The method of claim 12, wherein the MAC superframe includes:
- at least one contention access period following the beacon frame; and
- at least one contention free period including at least one unallocated time slot,
- wherein the at least one unallocated time slot includes the at least one multi-node connection frame.

14. The method of claim 12, wherein the MAC superframe includes:
- at least one contention access period following the beacon frame;
- at least one contention free period following the at least one contention access period; and
- an end part of allocation period following the at least one contention free period,
- wherein the end part of allocation period includes the at least one multi-node connection frame, length information of the at least one content access period, and group acknowledgement information indicative of acknowledgement to uplink transmission of the device.

15. The method of claim 12, wherein the device specific information includes slot allocation information for the device.

16. The method of claim 12, wherein the network specific information includes information about a number of free time slots, information about a location of the free time slots, and information about a number of devices in the wireless communication network.

17. A method for transmitting a medium access control (MAC) superframe by a controller in a wireless communication network, the method comprising:
- receiving, by the controller, a connection request from at least one device, wherein the connection request indicates a request for a multi-node connection assignment; and
- transmitting, by the controller, MAC superframe including a beacon frame and at least one multi-node connection frame following the beacon frame for communication to the at least one device based on the received connection request,
- wherein the beacon frame includes beacon information including MAC superframe structure information and synchronization information synchronization of the device, information indicating whether the at least one multi-node connection frame is included in the MAC superframe, and position information of the at least one multi-node connection frame, and
- wherein the at least one multi-node connection frame includes device specific information including resource allocation information for the device and network specific information including configuration information of the wireless communication network.

18. The method of claim 17, wherein the MAC superframe includes:
- at least one contention access period following the beacon frame; and at least one contention free period including at least one unallocated time slot, wherein the at least one unallocated time slot includes the at least one multi-node connection frame.

19. The method of claim 17, wherein the MAC superframe includes:

at least one contention access period following the beacon frame;

at least one contention free period following the at least one contention access period; and an end part of allocation period following the at least one contention free period, wherein the end part of allocation period includes the at least one multi-node connection frame, length information of the at least one content access period, and group acknowledgement information indicative of acknowledgement to uplink transmission of the at least one device.

20. The method of claim 17, wherein the device specific information includes slot allocation information for the at least one device.

21. The method of claim 17, wherein the network specific information includes information about a number of free time slots, information about a location of the free time slots, and information about a number of devices in the wireless communication network.

22. A device in a wireless communication network, comprising:

a processor configured to perform communication using a medium access control (MAC) superframe including a beacon frame and at least one multi-node connection frame following the beacon frame; and a memory coupled to the processor and configured to temporarily store instructions capable of performing the MAC superframe including the beacon frame and the at least one multi-node connection frame following the beacon frame, wherein the beacon frame includes beacon information including MAC superframe structure information and synchronization information for synchronization of the device, information indicating whether the at least one multi-node connection frame is included in the MAC superframe, and position information of the at least one multi-node connection frame, and wherein the at least one-multi-node connection frame includes device specific information including resource allocation information for the device and network specific information including configuration information of the wireless communication network.

23. The device of claim 22, wherein the MAC superframe includes:

at least one contention access period following the beacon frame; and at least one contention free period including at least one unallocated time slot, wherein the at least one unallocated time slot includes the at least one multi-node connection frame.

24. The device of claim 22, wherein the MAC superframe includes:

at least one contention access period following the beacon frame;

at least one contention free period following the at least one contention access period; and an end part of allocation period following the at least one contention free period, wherein the end part of allocation period includes the at least one multi-node connection frame, length information of the at least one content access period, and group acknowledgement information indicative of acknowledgement to uplink transmission of the at least one device.

25. The method of claim 3, wherein the at least one multi-node connection frame is included in the at least one unallocated time slot.

26. The method of claim 3, wherein the MAC superframe includes:

an end part of allocation period following the at least one contention free period, wherein the end part of allocation period includes length information of the at least one content access period, and group acknowledgement information indicative of acknowledgement to uplink transmission of the device.

27. The method of claim 26, wherein the multi-node connection frame is included in the end part of allocation period.

* * * * *